Aug. 18, 1953   C. A. HAWKINS ET AL   2,649,061
SOIL TREATING DEVICE
Filed Nov. 24, 1947   7 Sheets-Sheet 1
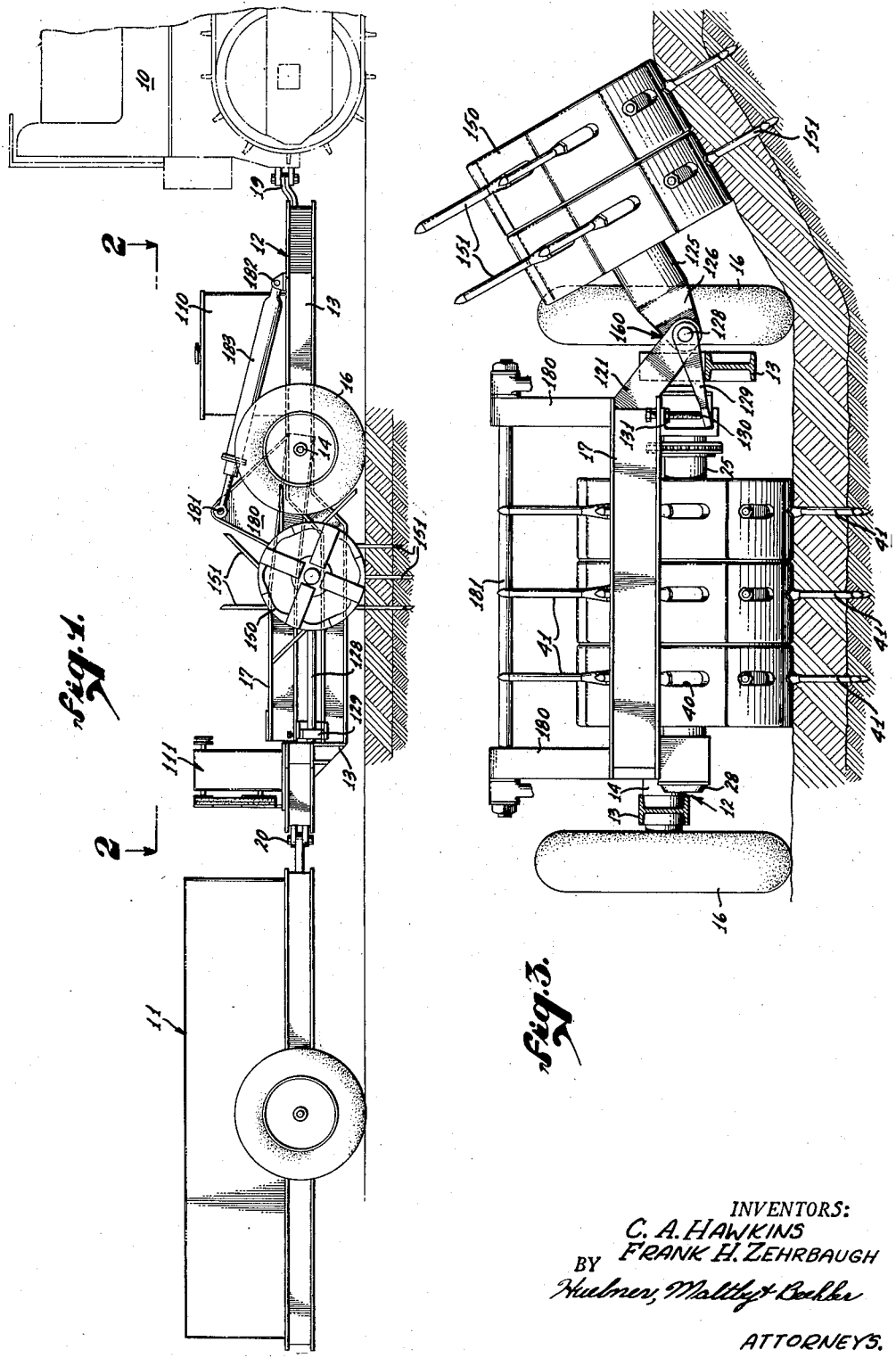
INVENTORS:
C. A. HAWKINS
FRANK H. ZEHRBAUGH
BY
ATTORNEYS.

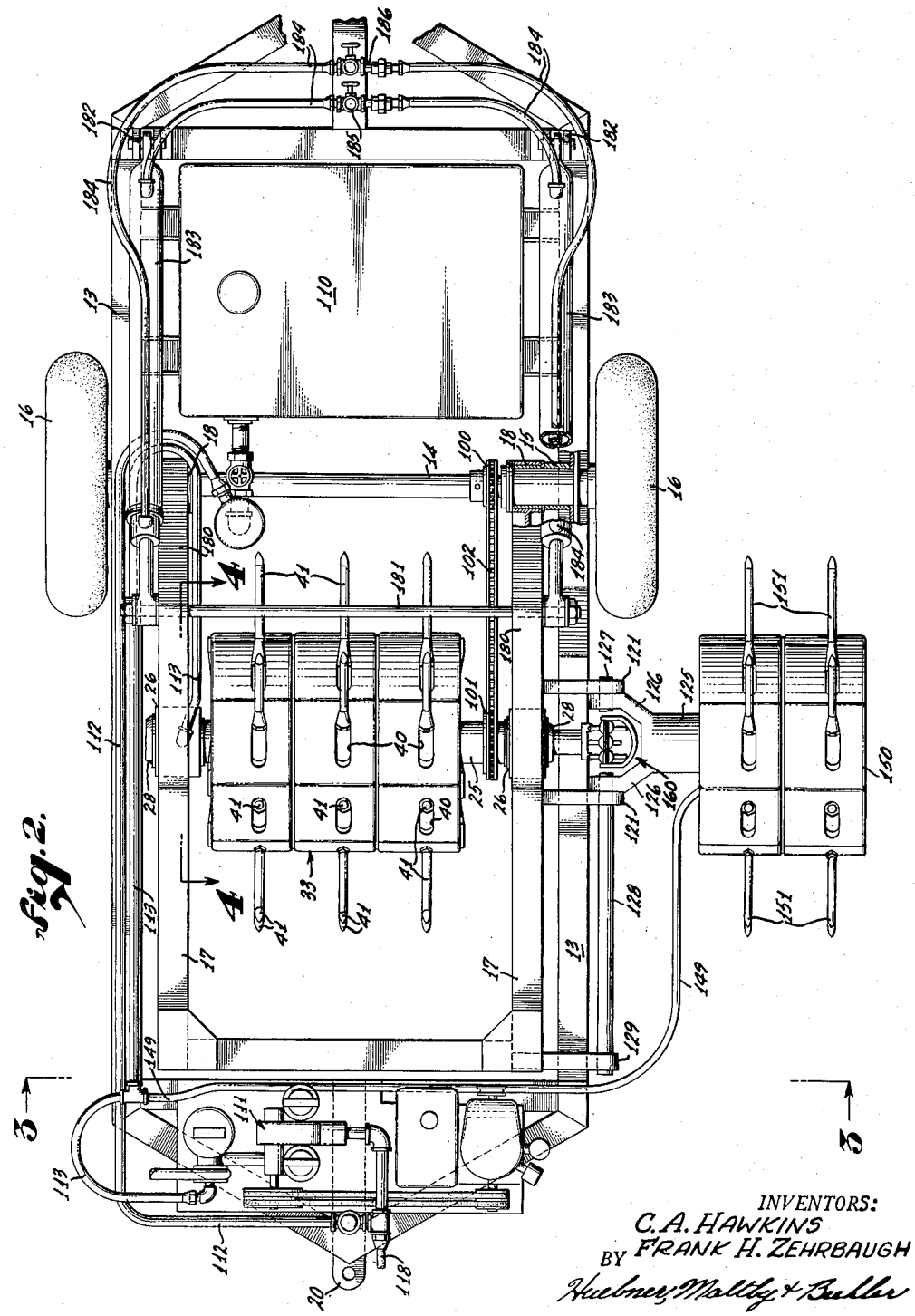

Aug. 18, 1953  C. A. HAWKINS ET AL  2,649,061
SOIL TREATING DEVICE
Filed Nov. 24, 1947  7 Sheets-Sheet 3

INVENTORS:
C. A. HAWKINS
FRANK H. ZEHRBAUGH
BY
Huebner, Maltby & Beeler
ATTORNEYS.

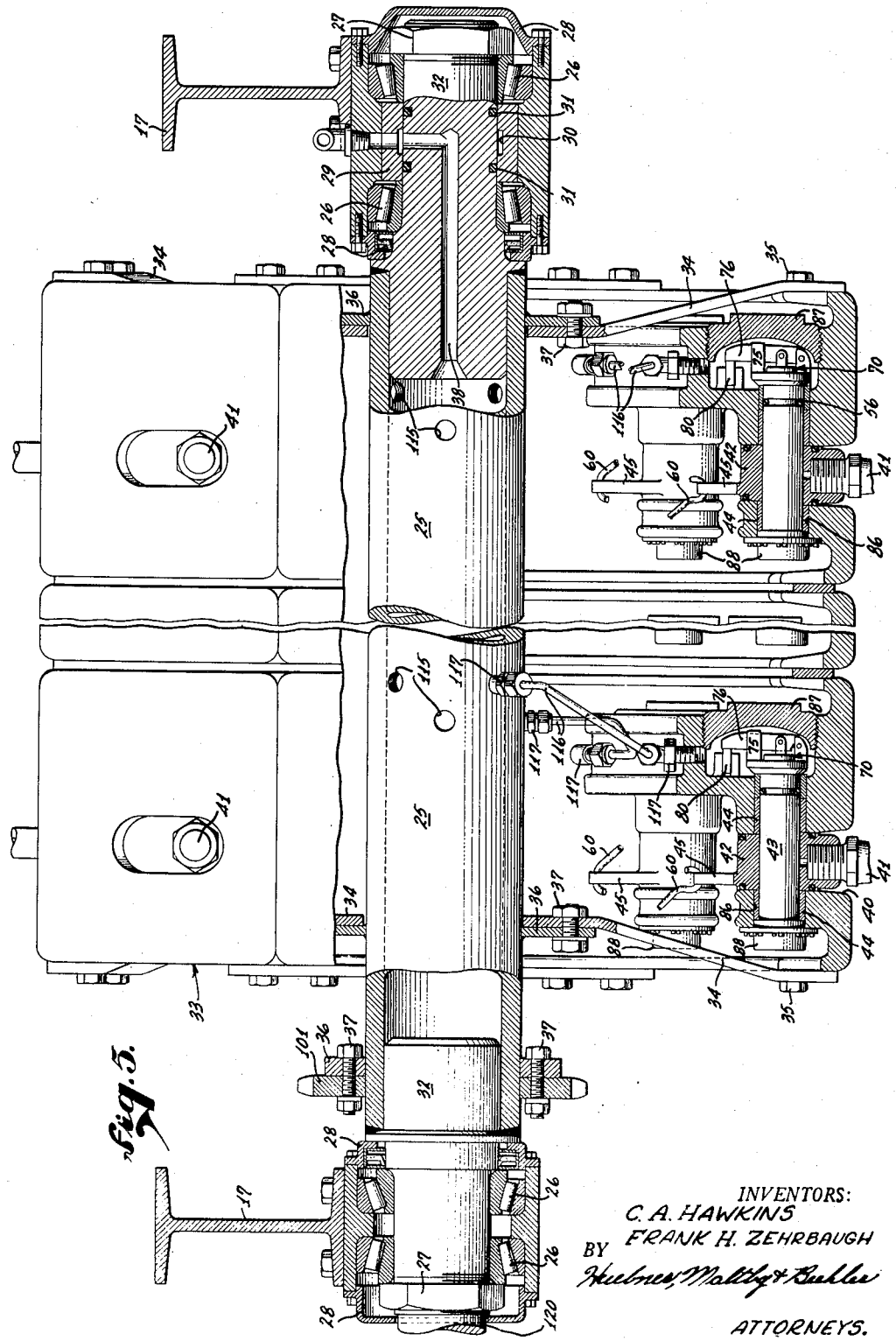

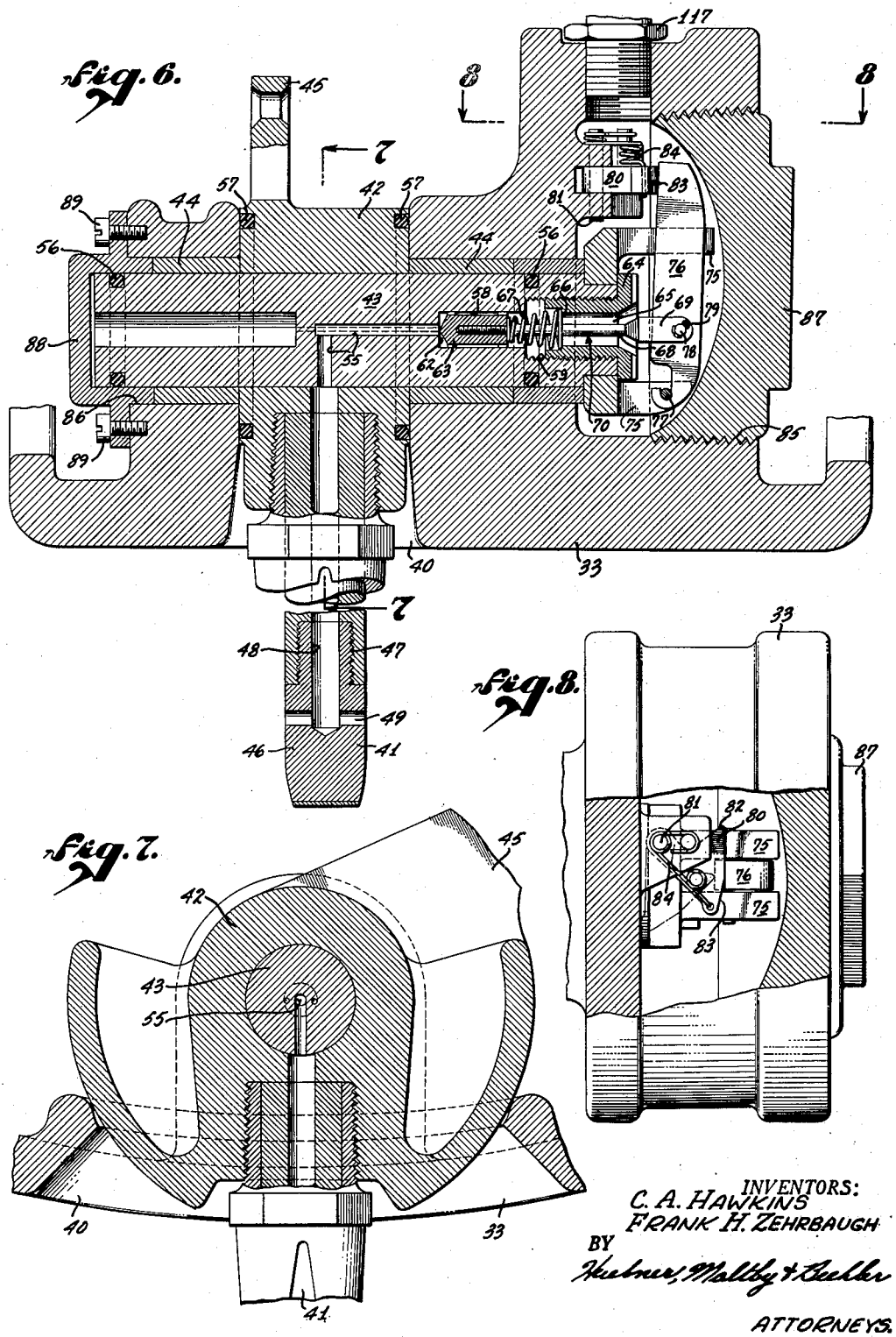

Aug. 18, 1953  C. A. HAWKINS ET AL  2,649,061
SOIL TREATING DEVICE
Filed Nov. 24, 1947  7 Sheets-Sheet 6
Fig. 12.
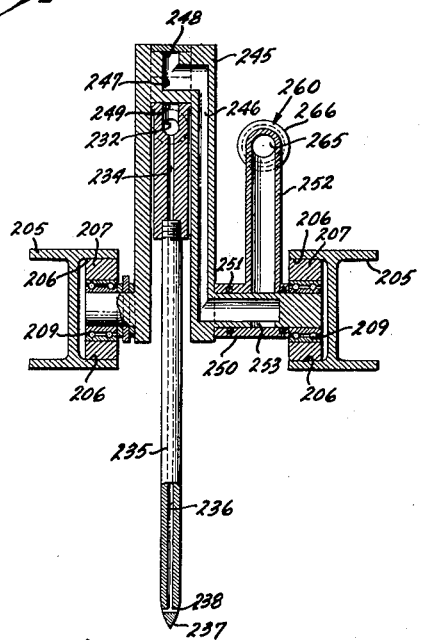
Fig. 13.
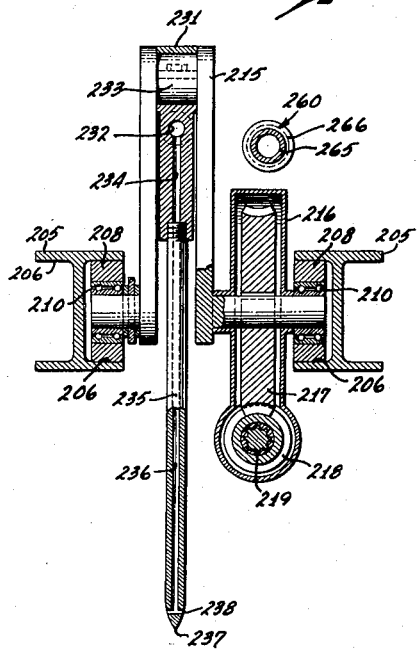
Fig. 9.
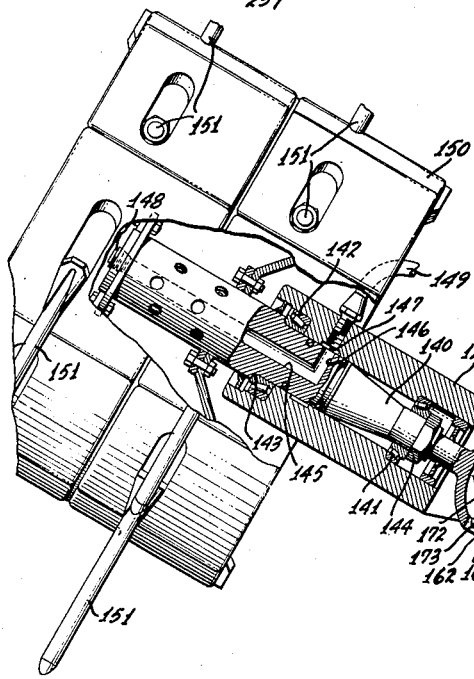
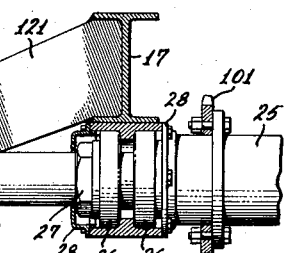
INVENTORS:
C. A. HAWKINS
FRANK H. ZEHRBAUGH
BY
Huebner, Maltby & Beehler
ATTORNEYS.

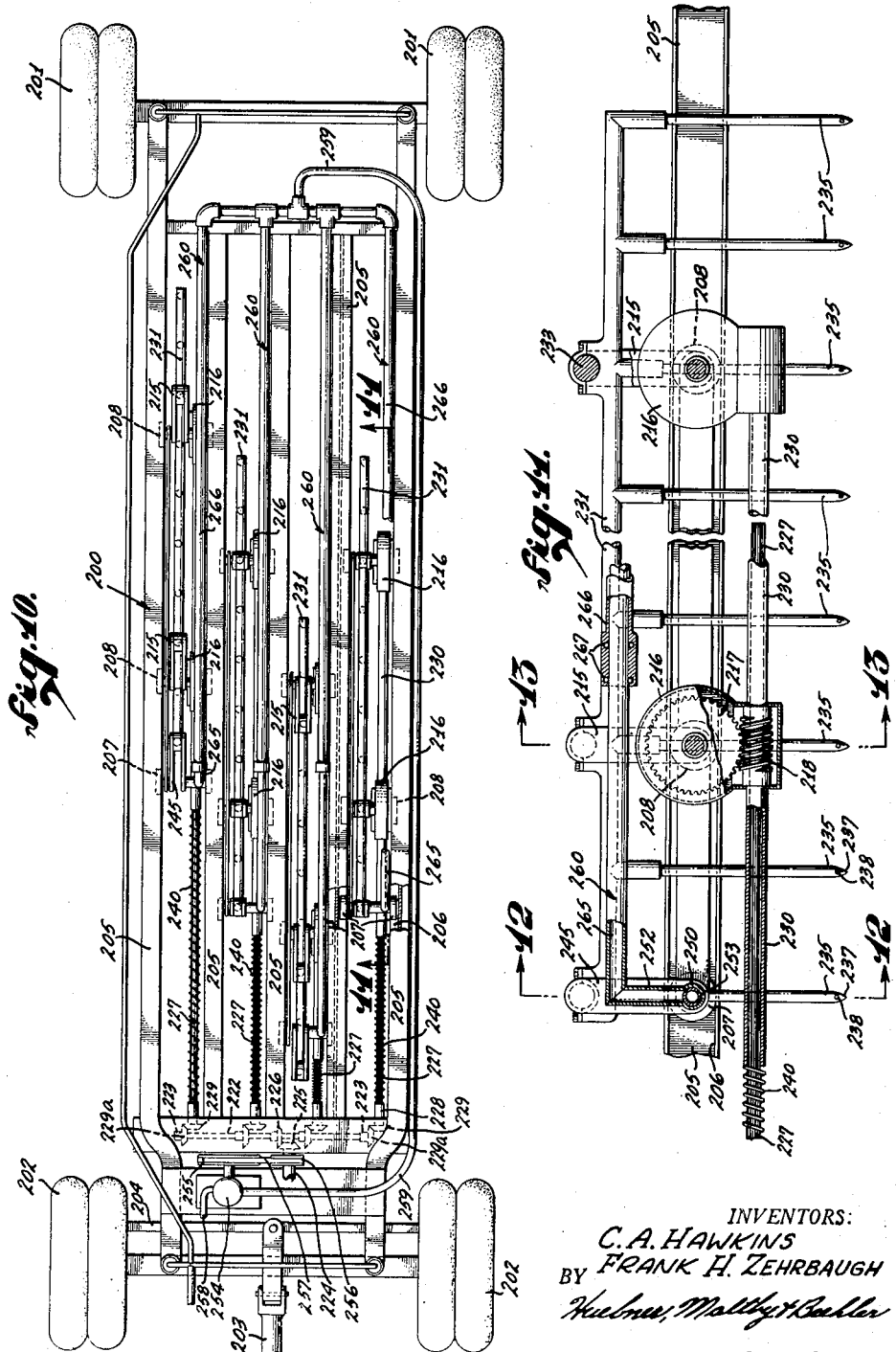

Patented Aug. 18, 1953

2,649,061

UNITED STATES PATENT OFFICE 2,649,061

SOIL TREATING DEVICE

Charles A. Hawkins, Fresno, and Frank H. Zehrbaugh, Los Angeles, Calif.; said Zehrbaugh assignor to said Hawkins; Odelia Comba Hawkins and Matilda B. Anway, coexecutors of said Charles A. Hawkins, deceased Application November 24, 1947, Serial No. 787,794

4 Claims. (Cl. 111—6)

1

The present invention relates to agricultural implements and more particularly to soil treating devices adapted to inject liquid fertilizer and other soil treating fluids into the earth. For purposes of convenience, the word "fluid" is to include pulverulent, liquid and gaseous materials, separately or together. Repetitious working of soil creates "plow-pan," a firmly packed stratum of earth lying just below the earth normally worked by cultivating implements. The roots of trees, shrubs and other crops fail to grow to any great extent above the plow-pan because of the frequent cultivation of the soil. Their growth below the plow-pan is subject to several serious difficulties.

The plow-pan presents a covering to roots that is resistive to the penetration of water, fertilizers, and other surface applied soil treating materials. Further, the plow-pan in resisting penetration of rainfall tends to increase run-off and subjects the land to erosion.

Although sub-soil plowing, breaks up the plow-pan permitting rainfall and irrigation water to penetrate the earth and to permit fertilizer and other soil treating materials to reach the roots of growing plants, there is a serious disadvantage in that the vigorous and deep action of the sub-soil plow seriously damages the roots of growing plants.

It has been a long felt need, in the cultivation of agricultural lands, to induce the penetration of water, fluid fertilizers, and other soil treating fluids into the earth. Not only is it significant to induce thorough penetration of such fluids but in many instances essential that such penetration be quickly achieved. Tests indicate that many valuable volatile constituents of fertilizers and other soil treating fluids are lost before absorption into the soil even though the absorption of a solvent or other environmental solution may eventually take place.

An object of our invention, therefore, is to provide means for injection of soil treating fluids into the soil.

Another object is to inject soil treating fluids into the earth with a minimum disturbance of the soil and of the roots of plants growing in the soil.

Another object is to provide a multiplicity of spaced perforations in the soil adjacent growing plants thereby promoting rapid penetration of fluid materials to the root feeding areas.

Another object is to reduce the waste of fertilizers experienced by the application thereof to the soil in conventional manners.

2

Another object is to apply fluid soil treating material in either gaseous or liquid state to the earth with a minimum loss of volatile constituents.

Another object is to provide a soil treating device adapted to inject soil treating fluids into the earth in accurately controlled amounts, at predetermined depths, and in an expeditious manner.

Another object is to provide a device of the character described that is rugged, dependable, durable and conveniently employed.

Other objects and advantages will become apparent in the subsequent description in the specification.

In the drawings:

Fig. 1 is a side elevation of a soil treating device embodying the principles of the present invention shown in towing relation to a fragmentarily illustrated draft appliance.

Fig. 2 is a plan view of the soil treating device shown in Fig. 1, but to a larger scale and with parts broken away.

Fig. 3 is a section taken on line 3—3 of Fig. 2.

Fig. 5 is a section taken for the most part on line 5—5 of Fig. 4, with a portion omitted.

Fig. 6 is a fragmentary enlargement of a valve structure taken from Fig. 5.

Fig. 7 is a section taken on line 7—7 of Fig. 6.

Fig. 8 is a fragmentary section taken on line 8—8 of Fig. 6.

Fig. 9 is a somewhat enlarged front elevation of a laterally extended member of the device shown in Fig. 3 showing portions thereof removed to reveal internal working parts.

Fig. 10 is a plan view of a second form of the present invention.

Fig. 11 is a fragmentary side elevation of the second form as seen from line 11—11 of Fig. 10.

Fig. 12 is a section taken on line 12—12 of Fig. 11.

Fig. 13 is a section taken on line 13—13 of Fig. 11.

Figure 4:
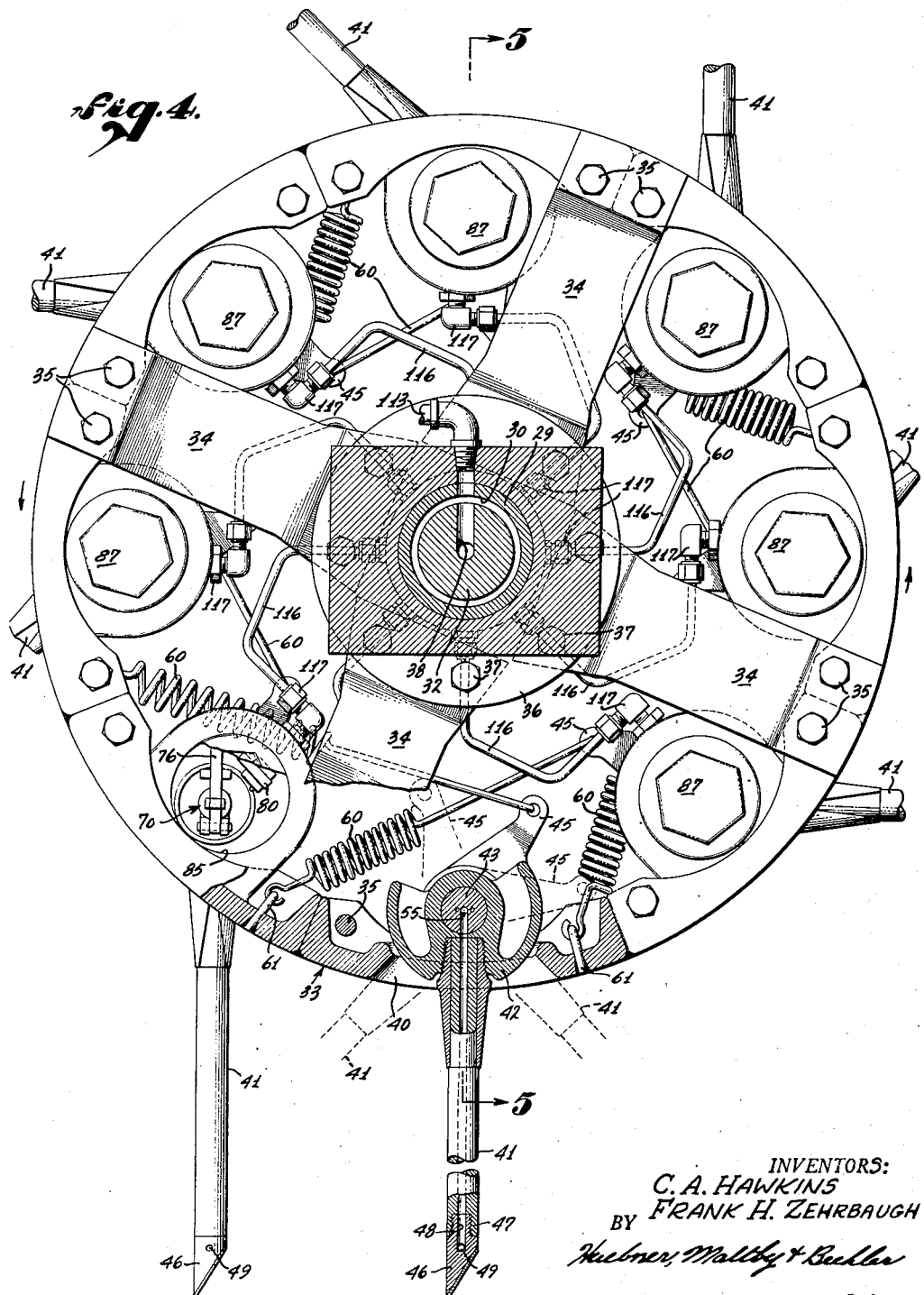
Fig. 4 is a section taken on line 4—4 of Fig. 2 and drawn to an enlarged scale.

Referring in greater detail to the drawings:

In Fig. 1 a tractor illustrative of draft appliances generally is indicated at 10 in towing relation to a soil treating device of the present invention which in turn is shown in towing relation to an auxiliary trailer tank 11. As will subsequently become apparent in the description, a considerable quantity of soil treating fluid is required. To avoid excessively frequent replenishing of the supply of the soil treating fluid, the tank trailer is advantageously employed.

The soil treating device of the present invention employs a forwardly movable draft frame 12 motivated in earth traversing movement by the tractor and drawing the tank trailer therebehind. The frame 12 preferably comprises a substantially rectangular outer frame portion 13 supported by an axle 14 journaled in the frame, as at 15, substantially transversely disposed the normal direction of movement of the frame. A pair of support wheels 16 are fixedly mounted on the axle in supporting relation thereto. The frame employs an inner frame member 17 pivotally mounted on the axle, as at 18, for pivotal elevational movement relative to the outer portion of the frame. Hitch means 19 and 20 are preferably provided at the forward and rearward end portions of the frame respectively. A hollow cylindrical shaft 25 is supported in the inner portion 17 of the frame 12 transversely disposed the normal direction of movement of the frame. The shaft is rotatably mounted in the frame by means of bearing members 26 receiving the shaft in journaled relation thereto. Nuts 27 are screw-threadedly engaged to the outer end portions of the shaft and in the familiar association with the bearing members serves to maintain the shaft in position. There is no invention claimed in the journaled mounting of the shaft and the same is thus not further described. The bearings are preferably provided with dirt seals 28.

A fluid feed bearing 29, having an annular groove 30 formed therein, is borne by the frame 17 circumjacent the shaft. Packing rings 31 are provided in the fluid feed bearing oppositely disposed the groove and in intimate contact with the shaft as is well known in such bearings to preclude leaking. Opposite ends of the shaft are plugged as at 32.

A substantially cylindrical drum 33 is mounted concentrically on the shaft. For purposes of structural convenience, the drum is made up of a plurality of arcuate segments in side by side arrangement. The segments are secured to spokes 34 and to each other as by means of stub bolts 35, welding, or other suitable means. It is clearly apparent that any suitable substantially cylindrical drum member may be employed of a shape suitable for rolling movement over earth traversed by the frame. The spokes 34 are secured to the shaft by any suitable structure such as by flanges 36 radially extended from the shaft and by bolts 37 inserted through the flanges and through inwardly extended end portions of the spokes, as shown in Fig. 5. The shaft is provided with a fluid passage 38 extended from the hollow interior of the shaft through a plugged end portion thereof to register with the groove 30 of the feed bearing 29.

The arcuate segments of the drum 33 are provided with centrally located elongated openings 40. A plurality of hollow injection tubes 41 are hingeably mounted on the drum for pivotal swinging movements forwardly and rearwardly, with reference to the direction of drum rotation, of radial relation to the drum. The terms "forwardly and rearwardly" are employed in reference to the rotational movement of the drum during normal operation which is in a counter-clockwise direction as seen in Fig. 4, the normal rotation of the drum in rolling action over earth traversed by the frame. The mounting of the injection tubes is shown in Fig. 6. The injection tubes are extended through the openings 40 and are screw-threadedly engaged to rocker members 42. The rocker members are pivotally mounted on substantially cylindrical pivot pins 43. The rocker members and the pivot pins are preferably in unitary relation and are journaled in the arcuate segments of the drum by bearings 44 providing their respective injection tubes with a pivotal axis longitudinally disposed the drum and transversely disposed their respective openings 40. Radially extended from the rocker members 42 inwardly disposed the drum are positioning arms 45.

The injection tubes 41 are provided with replaceable points 46 of case hardened steel or other suitable material resistive to wear. The points are preferably beveled so that upon insertion into the earth the lower end portion of their respective injection tubes are urged generally in the direction of movement of the frame. The beveled portion is slanted downwardly and forwardly relative to the direction of the movement of the frame when the injection tubes are in earth engagement, as shown in Fig. 4. Significance is attached to the beveling of the points in that said bevel assists the pins in entering the earth and in maintaining the pins in earth engagement during insertion and withdrawal thereof. For example, it has been found that opposite beveling or no beveling at all tends to cause the injection tubes to pry out of the earth engaged prematurely. Still further the beveling assists in imparting a detectable fore and aft wobble movement to the pins while in earth engagement facilitating insertion into earth traversed and withdrawal therefrom. The points are conveniently screw-threadedly engaged to the tubular members as at 47 and have fluid passages 48 registering with the hollow interiors of the tubes and providing fluid outlets 49 at the sides of the tubes where said outlets are least subjected to clogging action of the soil. The outlets are preferably funnel shaped so as to resist further any clogging thereof.

The pivot pins 43 are provided with fluid passages as at 55 in Fig. 6 registering with the hollow interiors of the injection tubes. To preclude leaking of fluid at the juncture of the injection tubes and the passages 55 fluid seals are provided at 56 near opposite end portions of the pivot pins 43 and at 57 in the rocker members 42. As will soon become apparent, it is important that fluid under pressure be supplied to the injection tubes while in earth engagement but that said fluid supply be interrupted for each tube when said tube is disengaged from the earth. This is obviously directed to the saving of fluid fertilizers and other soil treating materials. Also, as will soon become apparent, the injection tubes are pivotally positioned relative to the drum so that they remain in substantially vertical positions, although having a detectable wobble movement, as they are inserted into earth traversed by the frame and withdrawn therefrom. As seen in Fig. 4, the pins are yieldably positioned or held on one side of a radial relation to the drum for insertion into the soil by means of helical tension springs 60 interconnecting the positioning arms 45 and a projection 61 extending into the drum. Thus as the drum is rotated the injection tubes are inserted into the earth and by relative rolling action of the drum over the earth traversed, the earth causes the tubes to be positioned radially in relation to the drum and subsequently disposed rearwardly of said radial position, with reference to the direction of drum rotation, as the tubes are withdrawn from the earth. It is therefore quite apparent that during earth engagement the injection tubes are traveled from positions forwardly of their radial relation to the drum to positions rearwardly of said radial relation. This forward to rearward movement of the pins coincides with the period during which it is desirable to deliver fluid under pressure to the tubes. Thus the problem is to provide a valve means for valve fluid under pressure to the injection tubes during rearward movement thereof and closed when said tubes are in their forward or rearward extremes of their pivotal movement or while moved from said rearward positions to their forward positions. To this end a valve structure indicated generally at 70 is shown in Fig. 6.

The passages 55, as seen in Fig. 6, are preferably extended from a position adjacent their juncture with their respective injection tubes longitudinally of their pivot pins 43 to an end portion thereof. During said longitudinal extension of the passage successive enlargements are provided as at 58 and 59. An annular valve seat 62 is provided at the inner end of the enlarged portion 58 of the passage. A valve body 63 is slideably fitted in the enlarged portion 58. A bushing 64 is screw-threadedly engaged in the enlarged end portion 59 of the passage 55. The bushing has a co-axially disposed opening 65 formed therethrough in substantial alignment with the enlarged portion 58 of the passage. A thrust washer 66 is positioned at the inwardly disposed end portion of the bushing 64. A helical compression spring 67 is interposed between the valve body 63 and the thrust washer 66 urging said valve body into seated relation with the valve seat 62. A control rod 68 is screw-threadedly engaged to the valve body 63 and extended outwardly through the opening 65 of the bushing 64. The outwardly extended end portion of the control rod 68 is bifurcated as at 69. Slotted guides 75 are mounted on the bushing 64 on opposite sides of the opening 65. A trigger 76 is pivotally mounted in one of the guides as at 77, received by the bifurcated end portion 69 and extended through the oppositely disposed guide member. A pin 78 is extended through the bifurcated end portion 69 and the trigger 76 and secured in position as by means of cotter keys 79. It will be apparent to anyone skilled in the art that equal or substantially equal fluid pressures may be imparted to opposite sides of the valve body to achieve more efficient operation thereof, if desired.

A cam member 80 as shown in Figs. 6 and 8 is pivotally mounted in the drum as at 81 for engagement with the extended end portion of the trigger 76. Attention is directed to the unitary movement of the injection tubes 41, rocker members 42, pivot pins 43, and guides 75 as the tubes are reciprocally positioned. This causes the trigger 76 to be reciprocally positioned in response to said pivotal movement. The cam is provided with a catch portion 82 and a wedge portion 83. As seen in Fig. 8, the cam is positioned relative to the trigger 76 so that as said trigger's respective injection tube is moved from its forward position to its rearward position relative to direction of drum rotation, as by earth engagement, the extended end portion of the trigger is caused to ride up over the wedge portion 83 of the cam. This is upwardly as viewed in Fig. 8. The wedge portion 83 of the cam causes the trigger to assume the position shown in Fig. 6, drawing the control rod 68 to the right and unseating the valve body 63 from its valve seat 62. When the injection tube reaches its rearwardly disposed position the trigger drops past the catch portion 82 and the valve is closed through the urging of the spring 67. As the injection tube is moved from its rearward position to its forward position, preconditioned for insertion into the earth by the spring 60, the trigger 76 engages the catch portion 82 of the cam 80 and pivots the cam about its pivotal mounting 81. Thus the trigger does not ride up over the cam and its respective valve remains closed under constraint of the spring 67 during rearward to forward movement relative to drum rotation of the injection tube. By the time the injection tube has reached its forward position, the cam has pivoted a sufficient distance to permit the trigger to ride over the catch without opening the valve. A spring 84 is provided for the cam 80 to urge the cam into the position shown in Fig. 8. Thus as soon as the trigger has disengaged the catch portion of the cam said cam snaps back into position and upon the succeeding forward to rearward movement of the injection tube the valve is opened as before by the trigger riding over the wedge portion of the cam 83.

As shown in Figs. 4 and 6, the arcuate segments of the drum 33 are preferably configurated to house the valve and cam means, just described. Openings 85 and 86 respectively are provided in each arcuate segment in substantial alignment with said segment's respective pivot pin 43 and at opposite ends thereof. The opening 85 is preferably of sufficient extent to provide convenient access to the trigger arm 76, cam 80, and associated elements of the valve means and cam means. The opening 85 is conveniently sealed by a plug 87 screw-threadedly engaged therein. The opening 86 is closed by a cap member 88 secured in position as by means of cap screws 89. It is apparent that upon the removal of the plug 87 and the injection tube 41, the pivot pin 43 and associated elements comprising the valve means may be slid outwardly through the opening 85. In the event that the pivot pin resists such sliding movement, the cap 88 is removed and the pin readily driven through the opening 85.

It is clearly apparent that the present invention is not limited to the pivotal mounting and valve structure herein described, but may employ any suitable hinge member providing forward and rearward angling of the injection pins from radial relation to the drum and any suitable valve means synchronizing its opening with soil engagement of the tubes.

Another significant relationship of the drum 33 and injection tubes 41 is evident in Fig. 4. Inasmuch as the injection tubes are successively inserted and withdrawn from the soil in substantial alignment the problem of engagement of adjacent tubes during their angling movement is considered. It is evident that the angular throws of the injection tubes to achieve substantially vertical positions for insertion and withdrawal from the earth are determined by the radius of the drum. Thus the number of injection tubes radially disposed the drum affects the length of the tubes that may be borne thereby. Suffice it at this point to observe that the radius of the drum, the spacing of the injection tubes around the drum, the lengths of the tubes, and the limits of pivotal movement of the tubes are preferably so related as to permit substantially vertical positioning of the tubes during soil engagement and so as to preclude contact of adjacent tubes. Obviously, danger of contact exists only if a tube jams in one or the other extremes of its reciprocal movement.

It will be clearly apparent that the drum 33 may be rotated by rolling action over earth traversed by the device of the present invention. Such an arrangement, however, has been found to be less reliable than the preferred form of the invention illustrated in Figs. 1, 2 and 3. Positive rotation of the drum not only serves to make the operation of the device more dependable, but further greatly relieves the injection tubes from stresses imparted thereto where rolling action is relied upon for rotation. As previously described, earth traversing movement of the draft frame results in rotation of the wheels 16 in rolling movement over the ground and responsive rotation of the axle 14. The drum 33 is rotated in a simple and effective manner by providing a drive sprocket 100 on the axle and a substantially aligned driven sprocket 101 on the shaft 25. A chain 102, in engagement with the sprockets, serves to rotate the drum in response to axle rotation. The relative sizes of the sprockets are determined by the speed at which the drum is to be driven in earth traversing movement. Preferably this speed approaches but is slightly less than the speed at which the drum would normally roll over the ground. Thus, although the tubes 41 move rearwardly relative to the frame while in earth engagement, their movement relative to the earth is forwardly, albeit at a speed much less than that of said frame. This slight forward movement assists in imparting the detectable fore and aft wobble movement to the tubes, previously referred to, while in earth engagement. This wobble may be likened unto the levering of a crowbar to facilitate its insertion into the earth but is not of sufficient magnitude violently to disrupt the earth engaged and destroy roots growing therein.

The valve means for valving fluid to the injection tubes 41, and the passages for fluid through the tubes and out the outlets 49 have been previously described. Fluid under pressure may be supplied to the valve structures in any suitable manner. An acceptable arrangement has been found to include a fluid reservoir 110 mounted on the frame 12. A pressure pump indicated generally at 111 is also mounted on the frame. It has been found convenient to mount the fluid reservoir and the pump on the portions of the frame that are not pivotally elevated. A fluid supply conduit 112 interconnects the fluid reservoir and the input side of the pressure pump. A high pressure line 113 is connected to the high pressure side of the pump and to the fluid supply bearing 29, as shown in Fig. 5. The fluid supply bearing through the passage 38 feeds the hollow interior of the shaft 25. As shown in Fig. 5 and in Fig. 4, the shaft is provided with bores 115 individual to the valve means for the injection tubes. Fluid is conducted from the shaft 25 to the valve means by conduits 116 preferably connected to the shaft and to the valve means by unions 117. So arranged, the pump is fed from the fluid reservoir and pumps fluid under pressure to the shaft 25, wherefrom it is valved to the individual injection tubes in response to forward-rearward pivotal movement relative to drum rotation of the individual injection tubes. As previously mentioned, the trailer tank 11 provides a supplementary source of fluid. It may be connected for gravity flow to the reservoir 110 or as shown in the drawings connected to the low pressure side of the pump 111 as by the flexible supply conduit 118.

The extent of the invention now described has been found admirably suited to the perforation fluid treating of farm lands. A side attachment for the device shown in Figs. 2, 3 and 9 is adapted for the treating of ridged or furrowed soil. In the growing of grapes, for example, it is customary to plow earth towards the vines and during the productive season to leave a ridge of dirt in alignment with the vines. It thus becomes significant in vineyards so cultivated to be able to inject fluid fertilizers or other earth treating fluids into the ridges. To this end the shaft 25 is extended laterally from the bearing 26 as at 120 in Fig. 9. Inasmuch as it is desirable to be able to raise and lower the shaft 25 and the extension 120 thereof, the portion 13 of the frame 12 is offset downwardly to extend rearwardly below the shaft. A pair of brackets 121 are laterally extended from the portion 17 of the frame forwardly and rearwardly disposed the extension 120 of the shaft. A bearing member 125 having a bifurcated end portion 126 is pivotally mounted in the brackets and laterally extended therefrom for elevational pivotal movement. One leg of the bifurcated end portion 126 is pivotally mounted on the forward bracket as by a pivot pin 127. The opposite leg of the bifurcated portion is pivotally mounted in the rearward bracket 121 as by means of a torsion rod 128 secured to said leg journaled in said rearward bracket and rearwardly extended therefrom. The rearward end portion of the torsion rod is provided with a lever arm 129 which is extended inwardly toward the frame as shown in Fig. 3. To control the pivotal positioning of the bearing member 125, the lever arm 129 is raised and lowered. To the end of accurately maintaining the lever arm in position, a stub bolt 130 is screw-threadedly engaged in the frame 17 abutting the lever arm and secured in position as by means of jam nuts 131. Inasmuch as the weight borne by the bearing member tends to raise lever arm, it is only necessary to limit the upward movement of the same to achieve normal definition of the positioning of the bearing member. An obvious function of the torsion rod 128 is to provide resilient positioning of the bearing member, permitting the same to pivot upwardly and downwardly from adjusted position within the limits of elasticity of the torsion rod.

A stub shaft 140 is journaled in the bearing member 125 as at 141 and 142 respectively, of Fig. 9. The stub shaft is maintained in proper longitudinal position in the bearing member by means of a shoulder 143 and a nut 144 screw-threadedly engaged to the stub shaft. The stub shaft has a bore 145 formed longitudinally therein from the outwardly extended end portion of the shaft to a position short of the inner end thereof. The inner end of the bore is provided with a bore 146 radially extended therefrom within the bearing member 125. A fluid supply groove 147 is provided in the bearing member circumjacent the radial bore 146 and registering therewith. The longitudinal bore 145 is provided with a plug 148 at the outwardly extended end portion of the shaft. Inasmuch as the bearing member does not rotate, fluid is conveniently supplied thereto and through the fluid supply groove to the bores 146 and 145 of the stub shaft by means of a high pressure feed line 149 connected to the feed line 113, as shown in Fig. 2.

A drum 150 having radially extended injection tubes 151 pivotally mounted thereon for recipfocal positioning forwardly and rearwardly disposed radial relation to the drum is mounted concentrically on the stub shaft 140. The form of the drum 150, the injection tubes 151, mounting means for the injection tubes, valve means, and other elements borne by the drum 150 are substantially similar to the elements borne by the drum 33 already described. Suffice it to say that the injection tubes 151 are positioned for insertion into earth traversed and for withdrawal from the earth in positions substantially perpendicular to the surface of the earth over which the drum 150 is motivated.

As previously mentioned, it is preferable to motivate the drums in rotational movement synchronously related to the earth over which they pass. To this end a universal joint, indicated generally at 160, is interconnected the inner end portion of the stub shaft 140 and the laterally extended end portion 120 of the shaft 25. The preferred structure for the universal joint is illustrated in Fig. 9, and is of a form providing constant speed rotation of the stub shaft 140 independent of the angularly relation of said stub shaft and the shaft 25. The inwardly extended end portion of the stub shaft is preferably bifurcated to form a pair of legs 161 equally and oppositely spaced from the axis of rotation of the stub shaft. A bearing frame 162 interconnects the inwardly extended end portions of the legs 161. The frame provides a socket 163 in substantial alignment with the axis of rotation of the stub shaft. A pair of sockets 164 are provided between the socket 163 and the opposite leg portions. The sockets 164 are preferably equally and oppositely displaced from the axis of rotation of the stub shaft 140. A ball bearing 170 having a concentrically splined opening formed therethrough is mounted in the socket 163. A ball bearing 171 having a concentrically formed cylindrical opening extended therethrough is mounted in each of the sockets 164. A splined shaft 172 is extended coaxially from the lateral portion 120 of the shaft 25 and slideably received in the splined opening of the ball bearing 170. A pair of radially spaced driving arms 173 are mounted on the lateral portion 120 of the shaft 25 and slideably extended through the openings in the ball bearings 171. The driving arms 173 are pivotally mounted on the lateral portion 120 of the shaft 25 as by wrist pins 174. The wrist pins limit pivotal movement of said splined shaft and driving arms to planes of movement substantially radially related to the shaft 25 and thus to the stub shaft 140. There are two significant relationships of elements of the instant constant speed universal joint that are believed to be critical, and to which particular attention is now directed. First, the longitudinal extension of the axis of rotation of the shaft 25 must intersect the longitudinal extension of the axis of rotation of the stub shaft 140 and said intersection must maintain a substantially constant position relative to said shaft and said stub shaft. In the structure described, the intersection of the longitudinal extensions of the axes occurs in the center of the ball bearing 170. Upon analysis, it will be apparent that the employment of the ball bearing 170, as described, is a useful adjunct to the present invention but is in no sense essential; it being sufficient that said longitudinal extensions of the axes of the shaft and of the stub shaft intersect in a position having a substantially constant relationship to said shafts. The longitudinal extensions of the shafts are purely imaginary means for defining angular relationships of the shaft and the stub shaft and need not be embodied in any specific elements. The mounting of the stub shaft in the bearing member 125 and the mounting of said bearing member on the frame, as described, achieves the relationship desired. It is clearly evident that the pivotal axis of the bearing member intersects the longitudinal extensions of the axes of rotation at their point of intersection. Thus the bearing member and the stub may be pivotally, elevationally positioned without molesting the critical relationship indicated. Second, the sockets 164 must be radially spaced from the axis of rotation of the stub shaft 140 so that the distances between the centers of the bearings 171 mounted in said sockets and said axis of rotation of the stub shaft are equal to the distances between the pivotal mounting of the driving arms 173 and the axis of rotation of the shaft 25. That is, the radial distance that a driving arm is pivotally mounted on the shaft 25 from the axis of rotation thereof must be substantially equal to the radial distance between the engagement of said driving arm with the stub shaft and the axis of rotation of said stub shaft to achieve constant driving speed. It will be observed that a single driving arm is sufficient to transmit rotation of the shaft to the stub shaft. So associated, rotation of the shaft 25 as previously described rotates the stub shaft 140 in direct response thereto and at a speed of rotation at all times equal to the speed of rotation of the shaft 25.

Provision was made for the elevational pivotal movement of the member 17 of the frame 12 for the purpose of raising and lowering the drums 33 and 150 to bring their respective injection tubes into earth engagement and to disengage the earth at will. The member 17 of the frame may be controllably positioned in numerous manners. A satisfactory structure for the purpose is shown in Figs. 1 and 2. Arms 180 are weldably secured to opposite sides of the member 17 of the frame and upwardly extended therefrom. A cross tie 181 interconnects the upwardly extended end portion of the arms. A pair of ears 182 are welded upwardly disposed at the sides of the forward end portion of the frame. A two-way ram 183 is pivotally interconnected each pair of ears and the cross tie. Fluid feeding and bleeding lines 184 are connected to opposite end portions of the rams. The feeding and bleeding lines connected to respective end portions of their individual rams are joined as at 185 and 186 respectively and in turn connected to any suitable source of fluid under pressure and valve means (not shown) whereby the rams are positively extended and contracted at will as is well known in hydraulic control systems.

*Operation*

The operation of the device of the present invention is obvious and is briefly summarized at this point. Earth traversing movement is imparted to the frame 12 and the trailer 11 by the tractor 10. The drum 33 and the laterally positioned drum 150 are preferably elevated to disengage the injection tubes 41 and 151 respectively from the earth when the device is being transported to an area of operation. This is readily accomplished by manipulating the rams 183 to elevate the pivotal member 17 of the frame 12. Inasmuch as the member 17 of the frame is pivoted on the axle 14 and that the sprocket 100 is centered on the axle 14, the driving chain 102 is in no way rendered inoperable by elevational pivotal movement of the member 17 of the frame.

The stub bolt 130 functions as a stop and is adjustably positioned to achieve an angular relation between the stub shaft 140 and the shaft 25 to position the drum 150 in the desired attitude. It is clearly evident that the drum 150 may thus be accommodated to a ridge as shown in Fig. 3, or the stub shaft may be lowered, if desired, to a position in which the drum 150 is in substantial alignment with the drum 33. This latter arrangement would of course be employed only where substantially flat terrain comprises the area of operation.

So pre-conditioned for operation, the hydraulic rams 183 are extended to lower the pivotal member 17 of the frame to bring the injection tubes 41 and 151 into earth engagement to the depth desired. Usually the frame is lowered to an extent driving the injection tubes into the earth to their full extent.

As earth traversing movement is imparted to the frame, the shafts 25 and 140 are rotated by rotation of the wheels 16. As the drums rotate, their respective injection tubes 41 and 151 respectively are inserted into the earth traversed and withdrawn therefrom in substantially erect attitudes. The tubes are reciprocally angled between positions forwardly and rearwardly disposed radial relation to their respective drums, with reference to the direction of drum rotation and in forward to rearward movement fluid is forced through the tubes into the earth while the tubes are in earth engagement, the timing being accomplished by the valve means as described.

When a given area has been perforated to the extent desired and/or when it is desired to make a relatively sharp turn, the rams 183 are contracted to raise the pivotal members 17 of the frame and to disengage the injection tubes from the earth traversed. The positive driving of the shafts 25 and 140 by the sprockets 100 and 101 by the chain 102 clearly minimizes stresses imparted to the tubes as their respective drums are raised and lowered by manipulation of the ram. When unusually hard earth is treated, the two-way rams are extended forcing the pivotal member 17 of the frame downwardly and thus forcing the drums and their respective tubes downwardly. In this way, a considerable portion of the weight of the tractor 10 can be exerted in driving the injection tubes into earth traversed.

*Second form*

A second form of the present invention is illustrated in Figs. 10, 11, 12 and 13. The second form is directed to the general objectives previously described.

In Fig. 10 a forwardly movable draft frame is indicated generally at 200 supported by rear wheels 201 journaled in the rearward end portion of the frame and steerable wheels 202 at the forward end portion of the frame. A tow bar 203 provides ready connection to a draft appliance (not shown) and through a cross tie 204 convenient steering of the wheels 202.

A plurality of substantially parallel I beams 205 are longitudinally positioned in the frame 200. The I beams provide a plurality of oppositely disposed, juxtaposed, parallel tracks 206, as shown in Figs. 12 and 13, and are preferably machined to provide bearing surfaces. Slide blocks 207 and 208 respectively are mounted in the tracks of the I beams 205 longitudinally slidable in the frame 200. The slide blocks 207 and 208 are provided in juxtaposed pairs in oppositely disposed parallel tracks of adjacent I beams. The pairs of slide blocks 207 and 208, respectively, mount juxtaposed bearings 209 and 210, respectively, therein.

A pair of transversely disposed longitudinally spaced drive crank shafts 215 are mounted between each of the adjacent I beams 205 by being journaled in the bearings 210 of the slide blocks 208. As shown in Fig. 13, housing members 216 are mounted in unitary relation with one of the slide blocks 208 of each pair thereof in circumjacent relation to a pinion gear 217 fixedly mounted on the drive crank shaft. A worm gear 218 is journaled in each of the housings 216 longitudinally disposed the frame 200 and in engagement with their respective housing's pinion gear 217. The worm gears have concentrically disposed splined openings 219 formed therein.

To motivate the drive crank shafts 215, a master drive shaft 222 is journaled in the frame as at 223 transversely disposed the frame 200 near the forward end portion thereof. A drive shaft 224 is connected to a suitable source of rotary power (not shown) and is arranged in driving connection to the master drive shaft 222 through bevel gears 225 and 226, shown in Fig. 10. A plurality of splined drive shafts 227 are journaled in the frame, as at 228, and are slidably engaged within the splined openings 219 of the worm gears. Bevel gears 229a are mounted on the master drive shaft 222 and serve to motivate the splined drive shafts 227 by engagement with bevel gears 229 mounted thereon.

Attention is particularly directed to the slide engagement of each of the worm gears 218 with their respective splined shafts 227. Rotation of the splined shafts serve to rotate their respective worm gears and through the pinion gears rotate the drive crank shafts 215 independent of the longitudinal positioning of the drive crank shafts in the frame. To shield the splined shafts from an accumulation of dirt and other foreign material tending to impede slidable engagement of the worm gears thereon, a dirt shield 230 is extended from the housings 216 in circumjacent relation to the splined shafts.

A walking beam 231 having a longitudinal opening 232 formed therein is mounted in interconnecting relation between each pair of the longitudinally spaced pairs of drive crank shafts 215. The walking beams are journaled on the drive crank shafts, as at 233. The walking beams and their respective drive crank shafts are arranged so that the walking beams maintain substantially horizontal attitudes upon rotation of the drive crank shafts. The housings 216 and thus their respective drive crank shafts are conveniently maintained in spaced position by the dirt shields 230 which preferably interconnect the same in fixed spaced relation.

The walking beams have bores 234 downwardly extended from their respective opening 232. A plurality of injection tubes 235 are screwthreadedly engaged to the walking beams and are downwardly extended therefrom. The injection tubes provide longitudinal bores 236 registered with the bores 234 of the walking beams. The downwardly extended end portions of the injection tubes are preferably pointed, as at 237. The bores 236 preferably terminate short of the pointed end portions 237 and have laterally disposed outlets 238 provided therefor. The elevation of the I beams and the lengths of the injection tubes are so related as to bring the injection tubes into earth engagement during an arc of rotation of the drive crank shafts mounting said injection tubes' respective walking beams. The drive crank shafts 215 are preferably rotated at a speed so related to the earth traversing movement of the frame 200 that when the injection tubes 235 are in earth engagement they are traveled rearwardly in the frame by rotation of said crank shafts at a speed relative to the frame substantially equal and opposite to the speed of the frame relative to earth traversed. This permits the insertion and withdrawal of the injection from earth traversed in substantially vertical attitudes with a minimum of bending stresses and strains being imparted to said tubes. It will be recalled that the worm gears 218 are slideable on the splined shafts. Thus, should the speed of rotation of the drive shafts 215 vary from the desired speed, as described, the crank shafts are permitted to vary their longitudinal position in the frame so that the injection tubes move relative the frame with earth traversed thereby when in earth engagement. To avoid cumulative movement of the connecting rods rearwardly in the frame to the ends of the I beams 205, helical traction springs 240 are positioned circumjacent the splined drive shafts 227 and are interconnected said drive shafts' respective journal mountings 228 and the dirt shield 230.

To feed fluid to the openings 232, follower crank shafts 245 are journaled in the bearings 209 transversely disposed the frame 200 and to have axes rotation parallel to the axes of rotation of the drive crank shafts 215. A follower crank shaft is preferably provided near the forward end portion of each of the walking beams 231 and receives the latter in journaled relation thereto. Inasmuch as it is important that the walking beams be maintained in substantially parallel relation to earth traversed by the frame 200, it is obvious that the offsets in the drive crank shafts 215 and the follower crank shafts 245 are substantially equal. The follower crank shafts provide fluid passages 246 extending from adjacent one of its mounting bearings 209 into the offset portion of the crank shaft terminating within the journaled mounting of the walking beams thereon, as at 247. Bores 248 extend from the end portions 247 of the passages 246 preferably radially related to their respective follower crank shafts 245. Inasmuch as it is desirable to valve fluid to the injection tubes 235 only when said tubes are in earth engagement, a bore 249 is provided in each of the walking beams so as to register with the bore 248 in said walking beams respective follower crank shafts only during arcs of rotation of said crank shaft during which the injection tubes are normally engaged with earth traversed. A fluid feed bearing 250 is provided circumjacent each of the follower crank shafts 245 contiguous one of its bearings 209. The fluid supply bearings provide fluid seals 251 in positions adapted to preclude leaking of fluid from said bearings. A conduit 252 is extended upwardly from each of the fluid supply bearings 250. An opening 253 is provided radially in the follower crank shafts registerable with the conduit 252 providing communication between said conduit and the passage 246.

A fluid pump 254 of any suitable form is mounted in the forward end portion of the frame 200 and conveniently motivated by means of sheaves 255 and 256 respectively and an interconnecting band 257 from the drive shaft 224. The pump is connected to any suitable reservoir of fluid (not shown) at the low pressure side of the pump, as at 258. A fluid conduit 259 leads from the high pressure side of said pump to the rearward end of the frame.

Telescopic fluid conduits 260 interconnect the upwardly extended end portions of the conduit 252 and the high pressure conduit 259 at the rear of the frame. The telescopic conduits preferably provide inner tubular members 265 connected to the conduit 252 and rearwardly extended in the frame and outer tubular members 266 bearing fluid seals 267 in circumjacent relation to the tubular members 265 connected to the high pressure conduit 259. An advantage of feeding the telescopic fluid conduits 260 from the rearward end portion thereof is clearly evident when it is observed that the valving of fluid forced through said conduits to the injection tubes occurs only during rearward movement of the walking beams in the frame. Said rearward movement tends to contract the telescopic members and imparts increased pressure to the fluid by the reduction of volume capacity of the telescopic injection tubes resulting from said contraction.

*Operation of second form*

The second form of the device of the present invention is motivated in earth traversing movement by any suitable means and any desired soil treating fluid supplied thereto by connection to the pump 254 at 258. The drive shaft 224 is rotated as previously described resulting in rotation of the drive crank shafts 215 and responsive orbital travel of the walking beams longitudinally of the frame while in substantially parallel relation to earth traversed. Such motivation results in the periodic insertion and withdrawal of the injection tubes 235 from earth traversed while maintaining substantially vertical positions and the synchronous feeding of fluid from the pump 254 to said injection tubes' respective walking beams, as described, by the arrangement of the bores 248 and 249.

The device is drawn over an area desired to be treated. The injection tubes are driven into the earth traversed and soil treating fluid deposited in the earth near the lower end portions of perforations formed by the tubes. Disengagement of the tubes from the earth traversed results in an interruption of fluid flow to the tubes.

The devices of the present invention are conducive to effective fertilization and other earth treatment through their introduction of earth treating fluids at predetermined depths in the earth where needed. Inasmuch as the injection tubes of the two forms of the present invention are inserted into earth traversed and withdrawn therefrom while maintaining substantially vertical positions and while moving relative to their respective frames in unitary relation with earth engaged, a minimum of soil and root disturbances occur. The devices of the present invention enable the farmer to fertilize growing plants where most beneficial to the roots of such plants. Losses of volatile constituents of soil treating fluids are minimized by application under the surface of the soil. The multiplicity of perforations provided in earth traversed by the devices of the present invention are conducive to rapid absorption of rain water and irrigating water into the earth and a minimizing not only of waters normally wasted, but in an obviating of erosion due to water run-off. The devices of the present invention are easy to operate, rugged in structure, dependable, durable and convenient to employ. Their expeditious operation permits the injection of earth treating fluids into agricultural lands in a speedy and economical manner.

Although we have herein shown and described our invention in what we have conceived to be the most practical and preferred embodiments, it is recognized that departures may be made therefrom within the scope of our invention, which is not to be limited to the details disclosed herein, but is to be accorded the full scope of the claims so as to embrace any and all equivalent devices.

Having described our invention, what we claim as new and desire to secure by Letters Patent is:

1. A soil treating apparatus comprising a drum adapted to be advanced on the ground in rolling contact therewith, a tube pivotally mounted on said drum to project outwardly therefrom, said tube penetrating and withdrawing from the ground as said drum rolls thereover and pivoting relative to said drum through a predetermined angle while in the ground, a liquid conduit on said drum connected to said tube, and a valve controlling flow of liquid in said conduit, said valve being opened by said relative pivotal movement of said tube on said drum and held open during an intermediate part only of said angle of pivotal movement.

2. In a soil treating device having a drum rotated by earth traversing movement and a plurality of hollow injection tubes borne by the drum for successive earth engagement, a combined mounting means and valve means for the tubes comprising a pivot pin journaled in the drum and mounting an injection tube for pivotal movement in a plane of rotation at the drum, said pivot pin having a passage formed therethrough from the hollow interior of the tube to an end of the pivot pin, a valve member in closing relation to said passage, and means for seating and unseating the valve member in the passage in response to pivotal positioning of the injection tube.

3. In a soil treating device having a drum rotated by earth traversing movement and a plurality of hollow injection tubes borne by the drum for successive earth engagement, a combined mounting means and valve means for the tubes comprising a pivot pin mounted in the drum substantially parallel to the axis of rotation of the drum, a rocker member fixedly mounted concentrically on the pivot pin and mounting an injection tube in radial relation to the drum, said pivot pin and rocker member having a passage formed therethrough extending from the hollow interior of the injection tube to an end of the pivot pin and having a valve seat formed in circumscribing relation thereto within said pin, a valve body slideably mounted in the passage, resilient means urging the valve body into seated relation with the valve seat, and a valve manipulating means responsive to pivotal movement of the injection tube through reciprocal rotation of the pivot pin whereby the valve body is unseated during a predetermined unidirectional pivotal movement of its injection tube.

4. A device of the character described in claim 3 in which the valve manipulating means comprises a trigger arm pivotally mounted at an end of the pivot pin for pivotal movement in a plane radially related to said pin and a normal position in substantially right angular relation to the pin, a cam member in engagement with the trigger arm whereby said trigger arm is urged from normal position during a predetermined unidirectional pivotal movement of said pins injection tube, and a control arm interconnecting the trigger arm and the valve body.

C. A. HAWKINS.
FRANK H. ZEHRBAUGH.

References Cited in the file of this patent

UNITED STATES PATENTS

| Number | Name | Date |
|---|---|---|
| 396,891 | Peter | Jan. 29, 1889 |
| 489,033 | Proctor | Jan. 3, 1893 |
| 509,792 | Craft | Nov. 28, 1893 |
| 680,447 | Swedin | Aug. 13, 1901 |
| 827,857 | Fleak | Aug. 7, 1906 |
| 996,038 | Jass | Jan. 20, 1911 |
| 1,093,462 | Norris | Apr. 14, 1914 |
| 1,171,277 | Thayer | Feb. 8, 1916 |
| 1,174,283 | Riemenschnieder | Mar. 7, 1916 |
| 1,866,998 | Buel | July 12, 1932 |
| 1,871,529 | Karshner | Aug. 16, 1932 |

FOREIGN PATENTS

| Number | Country | Date |
|---|---|---|
| 49,017 | Germany | Oct. 8, 1889 |
| 205,825 | Great Britain | Jan. 15, 1925 |
| 225,866 | Germany | Sept. 21, 1910 |
| 363,357 | Italy | Oct. 3, 1938 |
| 643,395 | Great Britain | Sept. 20, 1950 |
| 651,812 | Germany | Oct. 20, 1937 |
| 867,503 | France | Aug. 4, 1941 |